United States Patent [19]

Yanagiuchi et al.

[11] Patent Number: 5,203,001
[45] Date of Patent: Apr. 13, 1993

[54] PORTABLE COMPUTER HAVING AN UPDATABLE TABLE OF STARTING ADDRESSES FOR ACCESSING THOSE STORED PROGRAMS HAVING BEEN PREVIOUSLY EXECUTED

[75] Inventors: Shigenobu Yanagiuchi, Tenri; Yasuhiko Takano, Nara, both of Japan

[73] Assignee: Sharp Kabushiki Kaisha, Osaka, Japan

[21] Appl. No.: 403,020

[22] Filed: Sep. 5, 1989

Related U.S. Application Data

[63] Continuation of Ser. No. 186,579, Apr. 27, 1988, abandoned.

[30] Foreign Application Priority Data

Apr. 27, 1987 [JP] Japan ................. 62-104975

[51] Int. Cl.⁵ .............................................. G06F 15/02
[52] U.S. Cl. ....................................... 395/800; 395/425; 364/706; 364/709.14; 364/928.3; 364/231.1; 364/231.2; 364/234.3; 364/DIG. 1
[58] Field of Search ... 364/200 MS File, 900 MS File, 364/706, 709.14; 395/425, 800

[56] References Cited

U.S. PATENT DOCUMENTS

| | | | |
|---|---|---|---|
| 4,145,742 | 3/1979 | Olander, Jr. et al. | 364/709 |
| 4,317,183 | 2/1982 | Shimizu et al. | 395/725 |
| 4,445,190 | 4/1984 | Pierschalla et al. | 364/900 |
| 4,507,743 | 3/1985 | Haneda et al. | 364/709 |
| 4,523,298 | 6/1985 | Sakurai | 364/900 |
| 4,636,970 | 1/1987 | Morino et al. | 364/706 |
| 4,695,983 | 9/1987 | Oda et al. | 364/709 |
| 4,718,029 | 1/1988 | Morino et al. | 364/710 |

FOREIGN PATENT DOCUMENTS

| | | |
|---|---|---|
| 0251477 | 1/1988 | European Pat. Off. . |
| 1455160 | 11/1976 | United Kingdom ................ 364/706 |
| 2040089 | 8/1980 | United Kingdom . |

OTHER PUBLICATIONS

"Powerful Personal Calculator System Sets New Standards" by: B. E. Musch, et al., 1266 Hewlett-Packark Journal, vol. 31 (1980) Mar., No. 3, Palo Alto, 3-11.

Primary Examiner—Lawrence E. Anderson
Assistant Examiner—Paul Harrity

[57] ABSTRACT

A portable computer that is capable of storing one or more application programs and designating one or more program running-start lines by a key input for each application program is provided. The portable computer includes a memory for storing the addresses of the program running-start lines for the previously executed programs, a decision unit for determining whether or not the memory has stored the address of the program running-start line that corresponds to the key input, a first processor for executing the program when the decision unit determines that the address of the program running-start line corresponding to the key input exists in the memory and a second processor for storing the address of the program running-start line corresponding to the key input in the memory when the decision unit determines that the address does not exist in the memory.

5 Claims, 3 Drawing Sheets

PORTABLE COMPUTER HAVING AN UPDATABLE TABLE OF STARTING ADDRESSES FOR ACCESSING THOSE STORED PROGRAMS HAVING BEEN PREVIOUSLY EXECUTED

This application is a continuation of application Ser. No. 07/186,579 filed on Apr. 27, 1988, now abandoned.

BACKGROUND OF THE INVENTION

The embodiments of the present invention relate to a portable computer that operates by application programs.

Many conventional portable computers store a plurality of application programs having program running-start lines that correspond to different keys so that a desired program is designated by a single key input. In such computers, each program running-start line has a label that corresponds to a particular key and enables a desired program to be run when the key corresponding to the particular program is depressed.

However, the above-described conventional portable computer must retrieve each label for every program in order to determine the appropriate program running-start line corresponding to a key input. Therefore, the computer will take a long amount of time to locate the appropriate program running-start line where the amount of time is proportional to the program capacity. As a result, a slow processing speed will occur.

SUMMARY OF THE INVENTION

An object of the embodiments of the present invention is to provide a computer having a high processing speed.

Another object of an embodiment of the invention is to provide a portable computer that retrieves a program running-start line of a program in response to a key input. The address of the program running-start line that is retrieved is stored in a memory so that the program corresponding to the key input of the program running-start line is executed only with reference to the address stored in the memory without having to retrieve the program.

Briefly described, in accordance with the embodiments of the present invention, a portable computer includes a memory for storing the address of the program running-start line of the previously executed program, a decision unit for determining the presence or absence of the address of the program running-start line in the memory for the program corresponding to a key input and a processing unit for executing the program that corresponds to the key input when the address of the program running-start line for the program corresponding to the key input exists in the memory or for storing the address of the program running-start line for the program in the memory and running the program when the address does not exist in the memory.

BRIEF DESCRIPTION OF THE DRAWINGS

The embodiments of the present invention will become more fully understood from the detailed description given hereinbelow and the accompanying drawings which are given by way of illustration only, and thus are not limitative of the present invention, wherein.

DESCRIPTION OF THE PREFERRED EMBODIMENT

Figure 1:
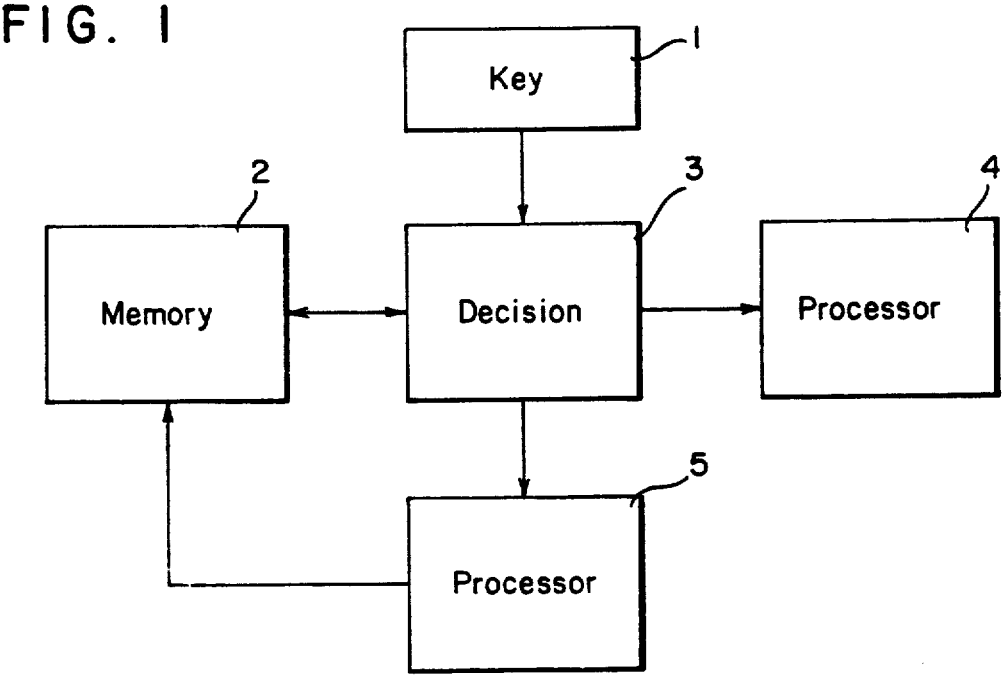
FIG. 1 shows the functional block configuration of an embodiment of the present invention.

FIG. 1 shows the functional configuration of the portable computer in an embodiment of the present invention. Referring to FIG. 1, a key input unit 1, a memory 2, a decision unit 3, and processing units 4 and 5 are shown.

The key input unit 1 designates a program running-start line for an application program that is written in BASIC. The memory 2 stores the address of the program running-start line for the previously executed program. The decision unit 3 determines whether or not the memory 2 retains the address of the program running-start line that corresponds to a key input from the key input unit 1. In response to the determination by the decision unit 3, the processing unit 4 runs the program from the program running-start line that corresponds to the key input. When the decision unit 3 determines that the address does not exist in the memory 2, the processing unit 5 stores the address of the program running-start line in the memory 2 that corresponds to the key input.

In the computer of the present embodiment, the decision unit 3 determines whether or not the address for the program running-start line that corresponds to the key input has been stored in the memory 2 in response to a key input from the key input unit 1. If the corresponding running-start line has been stored in the memory 2, the processing unit 4 executes the appropriate program from the program running-start line. If the corresponding running-start line has not been stored in the memory 2, the processing unit 5 stores the address of the program running-start line in the memory 2 and the processing unit 4 simultaneously executes the appropriate program from the program running-start line.

Figure 2:
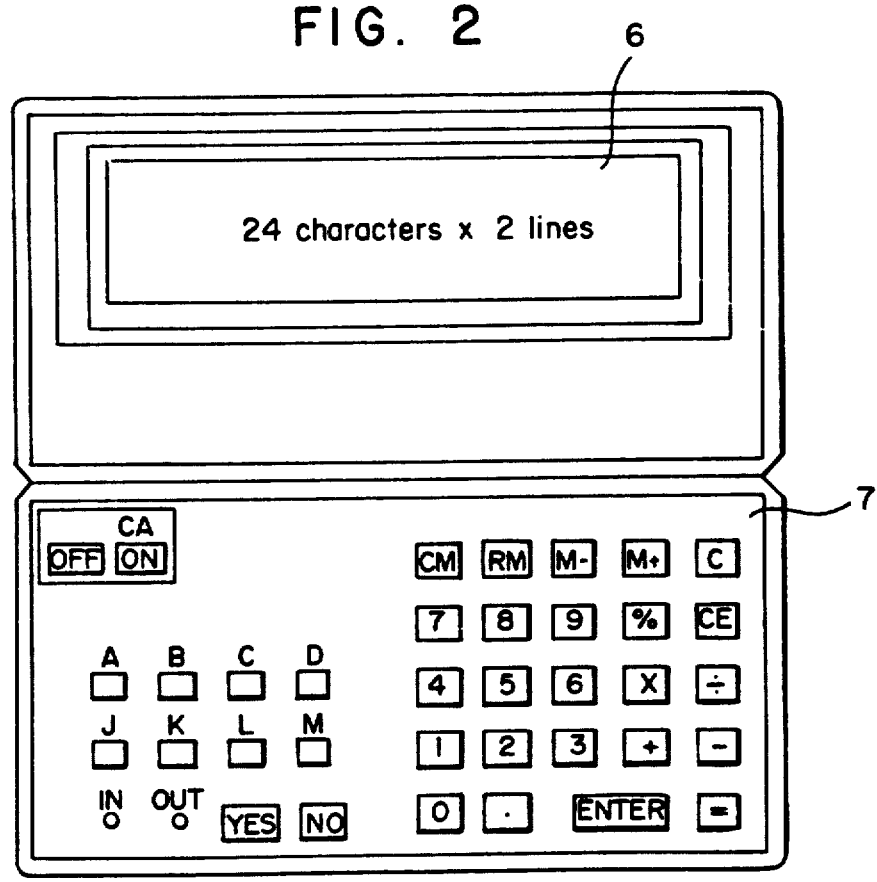
FIG. 2 shows the appearance of the embodiment of the present invention.

FIG. 2 shows the appearance of the portable computer for the present embodiment. The portable computer is small enough to be hand held when operated, and may be folded in two for carrying convenience. Referring to FIG. 2, a liquid crystal display (LCD) 5 and a keyboard are shown.

Input keys for inputting numerals and other data, operational keys for four rule calculations, and various function keys are arranged on the keyboard 7. Among the function keys are the keys "A", "B", "C", "D", "J", "K", "L" and "M" that correspond to the labels "A", "B", "C", "D", "J", "K", "L"and "M"and are respectively assigned to the program running-start lines in the BASIC application programs. A user is required to make application programs having labels that correspond to the function keys "A", "B", "C", "D", "J", "K", "L" and "M" (hereinafter referred to as definition keys) that are allotted to the respective program running-start lines. (Such programs are hereinafter referred to as definition programs.) To execute a particular program, the user depresses the definition key that corresponds to the label of the particular program.

Figure 3:
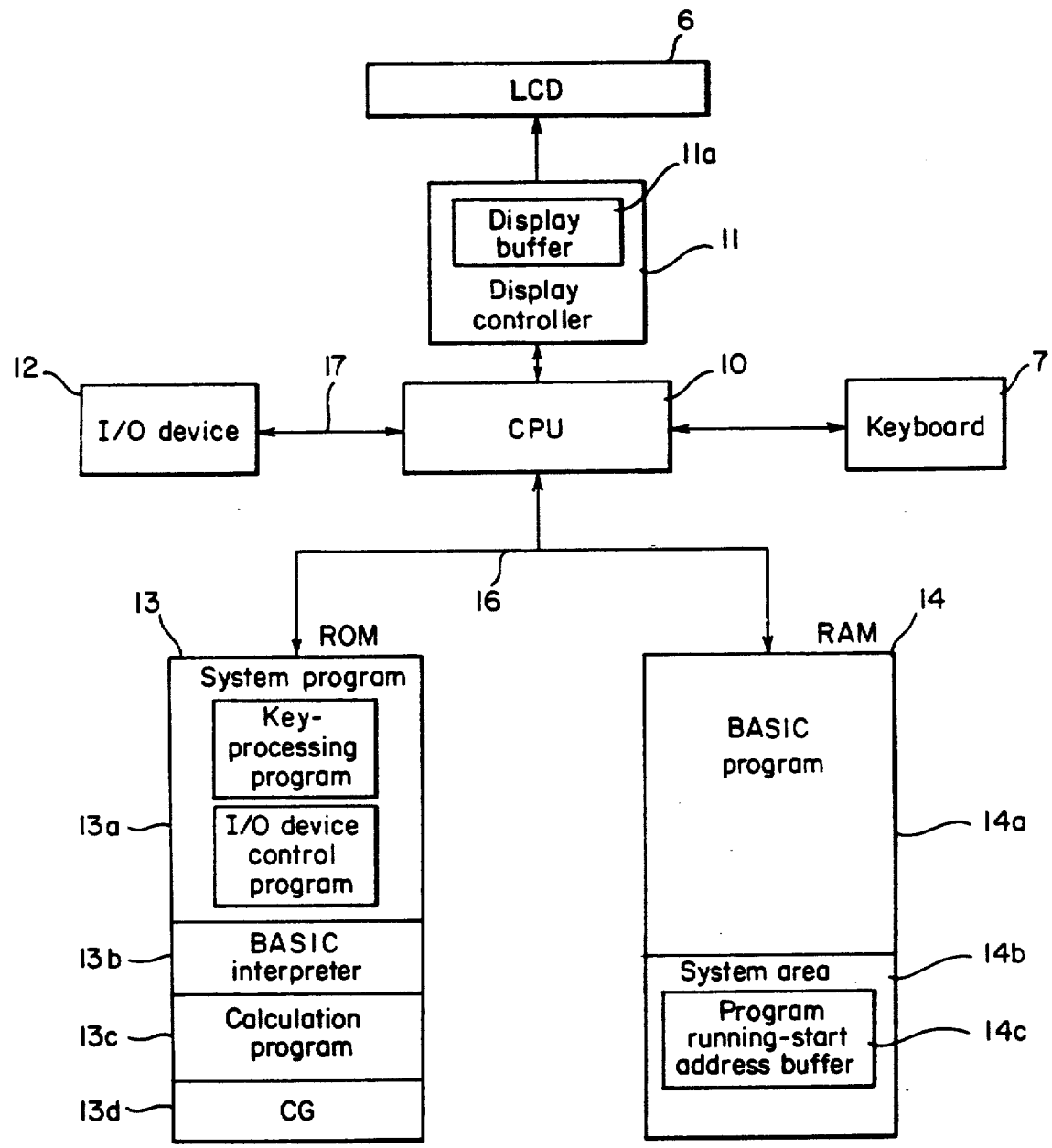
FIG. 3 shows the hardware construction of the embodiment of the present invention.

FIG. 3 shows the hardware construction of the portable computer of the present embodiment. The LCD 6, the keyboard 7, a CPU 10, a display controller 11, an I/O device 12, a ROM 13 and a RAM 14 are shown in FIG. 3.

The CPU 10 processes data according to various programs stored in the ROM 13. The ROM 13 is connected via a bus line 16 to the CPU 10. The CPU 10 also activates the decision unit 3 and the processing units 4 and 5 that are shown in FIG. 1 in order to perform their functions.

The LCD 6 is driven by the display controller 11 which contains a display buffer 11a for storing display data (dot data). The keyboard 7 supplies the CPU 10 with a code signal that corresponds to a key input.

The ROM 13 includes a region 13a for storing a system program and the system program has a key-processing program and I/O device control programs, a region 13b for storing a BASIC language interpreter, a region 13c for storing a calculation program which simulates the functions of a desk top calculator, and a region 13d for assigning a character pattern generator (abbreviated as CG) which develops a dot pattern from the code data of characters supplied by the CPU 10 to output to the display in this embodiment.

Like the ROM 13, the RAM 14 is also connected via the bus line 16 to the CPU 10. The RAM 14 includes a region 14a for storing BASIC application programs written as desired by the user, and a region 14b for various buffers and counters. The system region 14b includes a program running-start address buffer 14c for storing program running-start line addresses which will be described later.

The I/O device 12 is connected via a bus line 17 to the CPU 10. The I/O device 12 contains external deviceconnecting terminals for data communication with external devices (such as a printer and a magnetic disc device). The external devices are connected to the terminals according to the I/O device control programs stored in the ROM 13.

Figure 4:
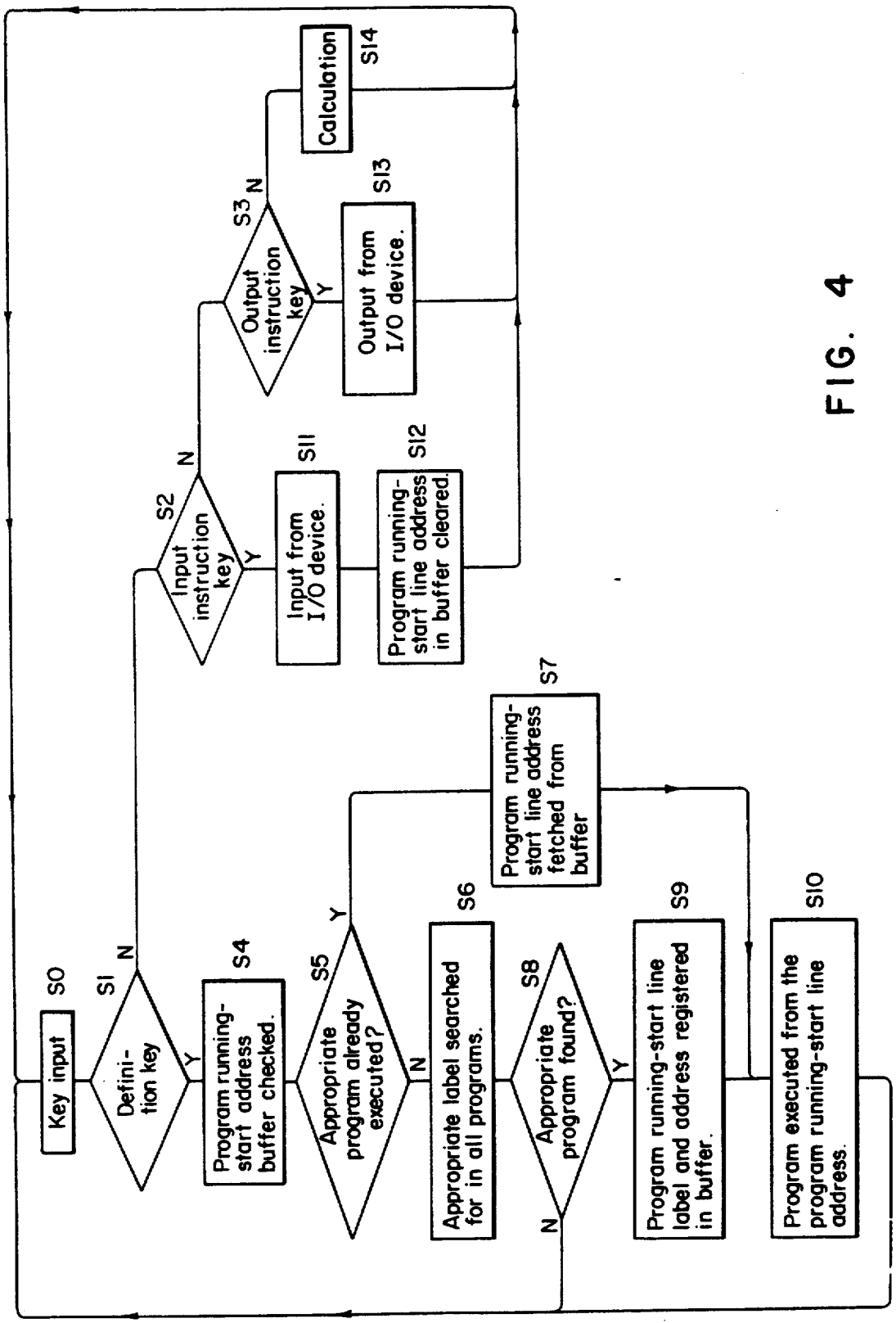
FIG. 4 is a flow chart that explains the processing sequence of the embodiment of the present invention.

FIG. 4 is a flow chart showing the processing sequence of the portable computer of the present embodiment. The procedure for designating a program running-start line of a particular program by a key input for executing the particular program is described below with reference to the flow chart of FIG. 4.

When a certain key is depressed (step S0), the key processing program determines whether or not the key is a definition key (S1). If the key is not a definition key, the program determines whether or not the key is an I/O instruction key (S2 and S3). If the key is an I/O instruction key, the key input is processed according to an I/O device control program (S11 and S12 or S13). Otherwise, the key input is processed according to the calculation program (S14).

If the depressed key is determined to be a definition key in step S1, the presence or absence of the program that corresponds to the key input is checked in steps S4 through S6 by the following method. First, the content of the program running-start address buffer 14c is checked (S4). The buffer 14c stores the labels and addresses of the program running-start lines for the previously executed programs. The content of the buffer 14c is checked to determine whether or not the data of the label and address for the program running-start line that corresponds to the definition key input (S5) is contained thereon. If the data is contained in the buffer 14c, the CPU determines that the corresponding data has been previously executed and the program running-start address data (S7) is fetched in order to start running the program from the fetched address (S10).

If the program running-start address buffer 14c does not contain the program running-start address data that corresponds to the definition key input, then the CPU determines that the program has never been executed. The CPU searches for the program that has the label corresponding to the definition key for all of the application programs stored in the RAM 14 (S6). When an appropriate program is not found, the CPU waits for the next key input. When an appropriate program is found, the label and address of the program running-start line are stored in the program running-start address buffer 14c (S9) so that the program can be executed in the future only by depressing the appropriate definition key. Finally, the program is executed (S10). When the same definition key is depressed in the future, the CPU surveys the program running-start address buffer 14c and retrieves the label and program running-start line address that corresponds to the definition key for executing the program from the program running-start line.

The data of the labels and addresses of the registered program running-start lines are cleared (S12) when a program is input through the I/O device 12 by depressing the input instruction key (S11).

According to the present embodiment, as mentioned above, a program running-start line for a program is retrieved in response to a key input. When the appropriate program running-start line address is found, the address is stored in the memory and the computer is enabled to execute the program in the future in response to the appropriate key input by referring to the address stored in the memory without looking for the program in each of the application programs. Thereby, the program retrieval task time is substantially reduced and the processing speed is increased.

While only certain embodiments of the present invention have been described, it will be apparent to those skilled in the art that various changes and modifications may be made therein without departing from the spirit and scope of the present invention as claimed.

What is claimed is:

1. A portable computer for storing a plurality of program running-start lines in a buffer of a random access memory, each of the plurality of program running-start lines defining location for a different one of a plurality of programs stored in a read only memory, said plurality of program running-start lines stored in said buffer corresponding to a number less than said plurality of programs stored in said read only memory; the portable computer comprising:

said buffer;

said read only memory;

key input means for selecting a designated program running-start line;

decision means, coupled to said key input means, said buffer, and said read only memory, for determining whether said designated program running-start line is stored in the buffer;

first processing means, coupled to said decision means, for searching said read only memory for said designated program running-start line, storing said designated program running-start line in the buffer, which defines the location of a designated program from the plurality of programs in the read only memory, and executing said designated program when said decision means determines that said designated program running-start line fails to exist in the buffer; and second processing means, coupled to said decision means, for locating said designated program running-start line in the read only memory without retrieving said designated program from the plurality of programs in said read only memory and immediately executing said designated program when said decision means determines that said designated program running-start line exists in the buffer.

2. A portable computer for storing a plurality of application programs in a program memory comprising:

key input means for generating a key address which designates program running-start lines for the plurality of application programs, each of said plurality of program running-start lines corresponding to a different one of said plurality of application programs;

memory means for storing addresses of said program running-start lines for each of the plurality of programs having been previously executed, said plurality of program running-start lines corresponding to a number less than said plurality of application programs stored in said program memory;

decision means, coupled to said key input means, said program memory, and said memory means, for determining whether the key address designated by said key input means exists in the program running-start lines stored in said memory means for a corresponding designated program from the plurality of application programs stored in the program memory;

first processing means, coupled to said decision means, for immediately executing said designated program when said decision means determines that the key address exists in said memory means; and second processing means, coupled to said decision means, for searching said program memory for said key address designating one of said program running-start lines, storing said key address in said memory means, and executing said designated program, when said decision means determines that said key address fails to exist in said memory means.

3. A portable computer comprising:

a first memory for storing a plurality of programs, each of said plurality of programs being defined by a different program running-start line;

a second memory for storing a plurality of addresses, each said plurality of addresses designated each said program running-start line for each of said plurality of programs, said plurality of addresses corresponding to a number less than said plurality of programs stored in said first memory;

key input means for designating a key input address;

decision means, coupled to said key input means and said first and second memories, for determining whether said key input address is equal to one of said plurality of addresses stored in said second memory;

program executing means, coupled to said decision means, for immediately executing a corresponding one of said plurality of programs stored in the first memory defined by said program running-start line designated by one of said plurality of addresses when said decision means determines that said key input address equals one of said plurality of addresses stored in said second memory;

processing means, coupled to said decision means, for searching a plurality of program addresses of said plurality of programs stored in said first memory for one of said program addresses equal to said key input address when said decision means determines that said key input address fails to equal one of said plurality of addresses stored in said second memory;

storing means, coupled to said processing means, for storing said key input address in the second memory, when said decision means determines that said key input address fails to equal one of said plurality of addresses stored in said second memory; and executing means, coupled to said processing means, for executing the program in said first memory found at the program address equal to said key input address, when said decision means determines that said key input address fails to equal one of said plurality of addresses stored in said second memory.

4. A portable computer according to claim 3, wherein said second memory comprises a RAM for storing said plurality of programs and the first memory comprises a buffer for storing the plurality of addresses, each said plurality of addresses designating each said program running-start line for each of said plurality of programs.

5. A method for storing a plurality of addresses in a first memory, each of said plurality of addresses corresponding to a different one of a plurality of programs stored in a second memory of a portable computer, the plurality of addresses stored in said first memory corresponding to a number less than said plurality of programs stored in said second memory; the portable computer comprising said first memory, said second memory, key input means, decision means coupled to said key input means, said first memory, and said second memory, first processing means coupled to said decision means, and second processing means, coupled to said decision means, the method comprising the steps of:

(a) designating a key input address by said key input means;

(b) determining, by said decision means, whether said key input address is equal to one of said plurality of addresses stored in said first memory;

(c) when said decision means determines that said key input address is equal to one of said plurality of addresses stored in said first memory,
  (ci) immediately executing, by said first processing means, a corresponding one of said plurality of programs stored in said second memory and designated by said key input address;

(d) when said decision means determines that said key input address is not equal to one of said plurality of addresses stored in said first memory,
  (di) searching, by said second processing means, said second memory for a program address of said plurality of programs equal to said key input address,
  (d2) storing, by said second processing means, said key input address in said first memory, and
  (d3) executing, by said second processing means, the program having said program address equal to the key input address.

* * * * *